April 5, 1960 G. S. SMELTZER ET AL 2,931,921

TRANSISTOR SWITCHING CIRCUITS

Filed March 19, 1957 2 Sheets-Sheet 1

TRANSISTOR SWITCHING CIRCUITS

Filed March 19, 1957 2 Sheets-Sheet 2

WITNESSES
Leon J. Taza
James F. Young

INVENTORS
George S. Smeltzer and
Milo W. Slye
BY
F. H. Henson
ATTORNEY

United States Patent Office 2,931,921

Patented Apr. 5, 1960

2,931,921

TRANSISTOR SWITCHING CIRCUITS

George S. Smeltzer, Pittsburgh, and Milo W. Slye, North Irwin, Pa., assignors to Westinghouse Electric Corporation, East Pittsburgh, Pa., a corporation of Pennsylvania Application March 19, 1957, Serial No. 647,071

4 Claims. (Cl. 307—88.5)

Figures 1, 1A, 2A:
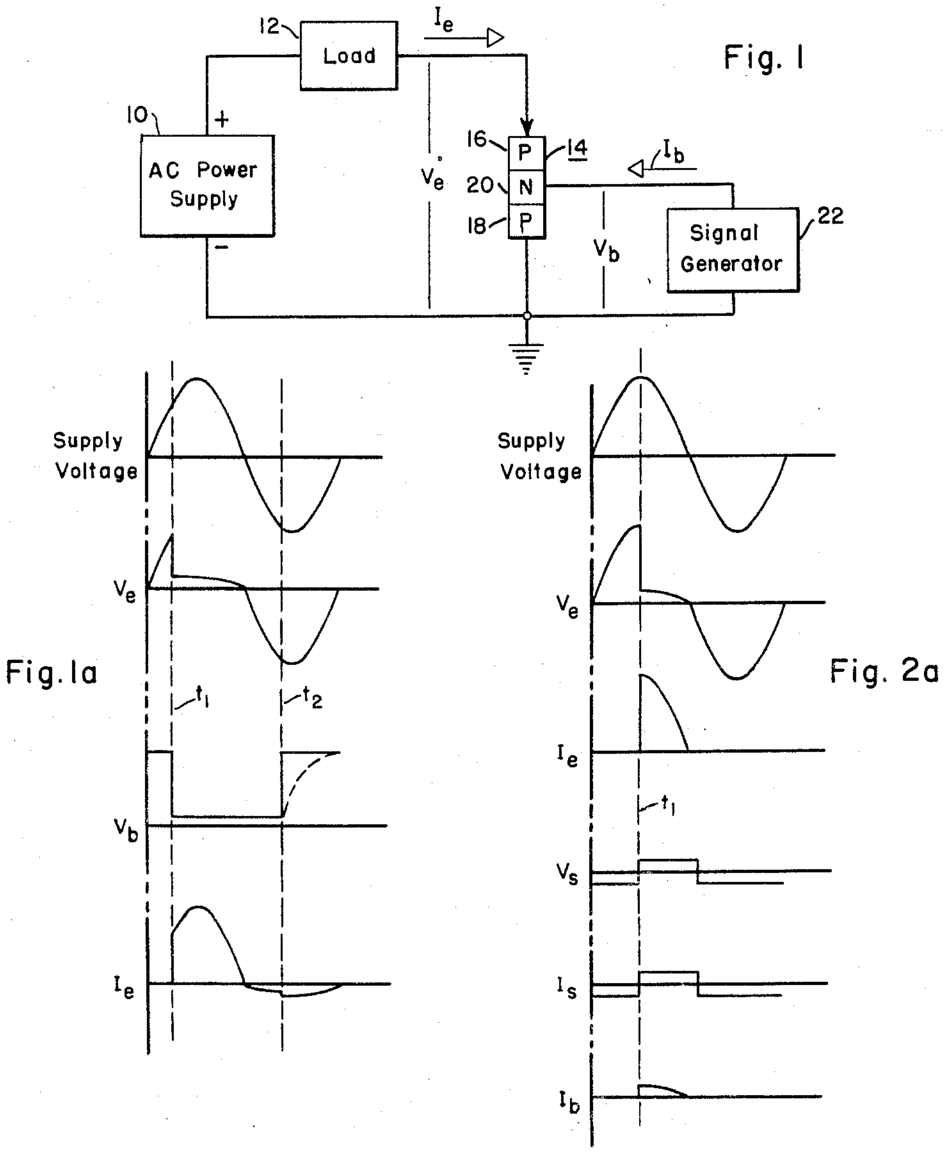

This invention relates to transistor switching arrangements and more particularly to transistor switching circuits adaptable for use in installations capable of handling relatively large currents.

As is well known, transistors have been successfully used as switching devices in control circuitry and the like where relatively small currents are employed. When a transistor is employed for power purposes, however, a problem arises in that leakage currents through the transistor may cause heat dissipation resulting in thermally generated carriers which swamp out the normal rectifying phenomenon of the transistor.

In a copending application of R. L. Bright, Serial No. 433,875, filed June 2, 1954, now abandoned, there is described a rectifier circuit which utilizes a transistor connected in a series circuit arrangement with an alternating current source and controlled by a square wave voltage which is in synchronism with the voltage of the source. In this manner, the transistor alternately conducts and is cut off on successive half cycles of the voltage of the source so that a unidirectional current flows in the circuit and very effective rectifying action is obtained. The arrangement has numerous advantages in that the transistor has a very much lower leakage current than an ordinary diode rectifier, and has a very low forward voltage drop as compared to the ordinary diode. During the conducting periods, therefore, while the current may be quite high, the voltage across the transistor is extremely low so that the power dissipated in the transistor is small; while during the cutoff periods, the voltage across the transistor may be high but the current is extremely small so that again the power dissipated is very small. Since the transistor changes abruptly from one state to the other as the square wave control voltage reverses polarity, the continuous power dissipation or loss in the transistor is very small and high efficiency is obtained.

For certain purposes the circuit described in the aforementioned application has some disadvantages. Since the control voltage is in synchronism with the supply voltage, the transistor will always conduct during the entirety of every other half cycle of the supply voltage; and, consequently, the current through the transistor cannot be controlled effectively. Also, if the supply and control voltages become out of phase, the transistor may be destroyed by heat dissipation.

It is an object of this invention to provide a transistor switching circuit which has a low forward voltage drop and low leakage current, but which overcomes the shortcomings of the device described in the aforementioned application.

Another object of the invention is to provide a transistor switching circuit for relatively high voltages and currents which incorporates current control through the transistor.

A still further object of the invention is to provide a transistor switching circuit which may be controlled by a signal having a much lower voltage level than the voltage applied across the transistor.

Figure 2:
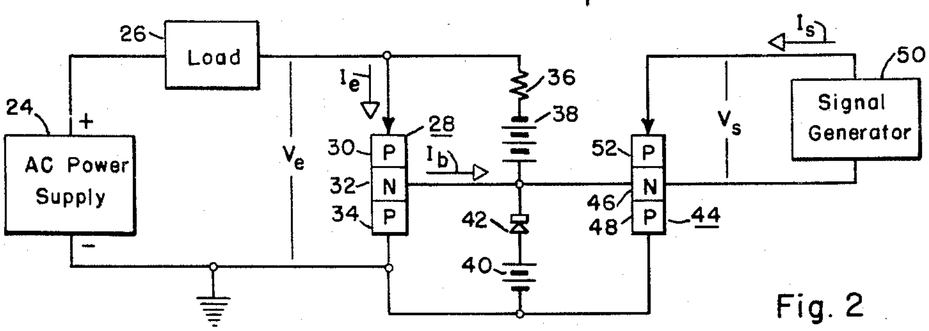
Figure 3:
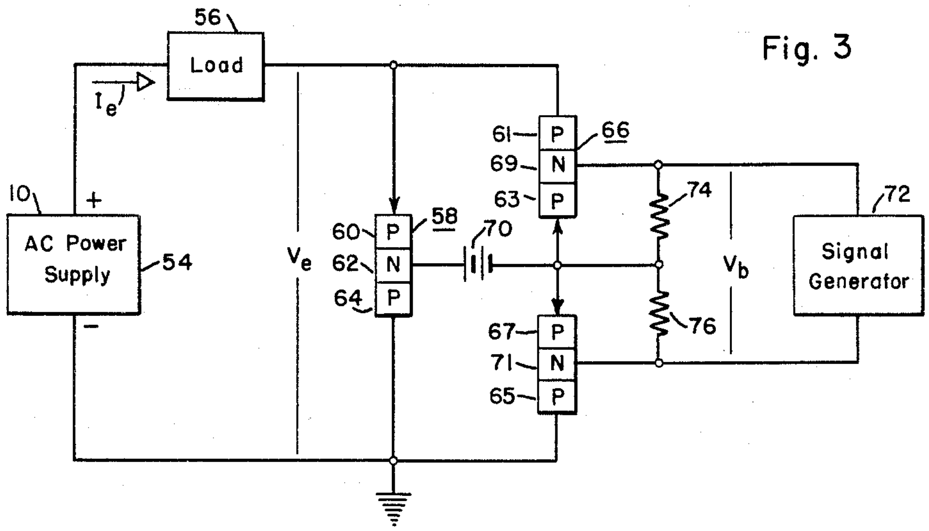
Figure 3A:
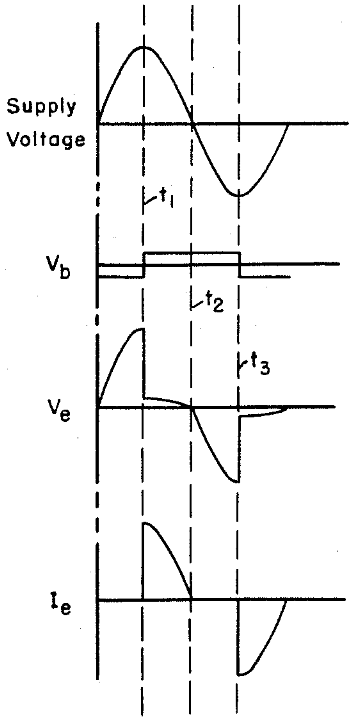

The above and other objects and features of the invention will become apparent from the following detailed description taken in connection with the accompanying drawings which form a part of this specification and in which:

Figure 1 illustrates one embodiment of the present invention which is used for rectifying purposes;

Fig. 1*a* is an illustration of waveforms appearing across various points in the circuit of Fig. 1;

Fig. 2 is another embodiment of the present invention used for rectifying purposes, and in which the control signal for the transistor has a much smaller voltage level than the voltage applied across the transistor;

Fig. 2*a* is an illustration of waveform appearing across various points of the circuit of Fig. 2;

Fig. 3 is another embodiment of the present invention in which a bidirectional current flows through the transistor; and Fig. 3*a* is an illustration of waveform appearing across various points of the circuit of Fig. 3.

Referring to Fig. 1, the embodiment of the invention shown comprises a source of alternating current voltage 10 which is connected in series with a load impedance 12 and a P–N–P transistor 14 having an emitter 16, collector 18 and base 20. Between the base and collector of transistor 14 is connected a square wave signal generator 22 which produces an output square wave signal which may be shifted in phase. Circuits of this type are well known in the art and may, for example, take the form of a time modulator or may be an arrangement such as that shown in the copending application of W. G. Hall et al., Serial No. 494,212, filed March 14, 1955, now U.S. Patent 2,798,970.

The P–N–P junction transistor 14 consists of a single crystal of N-type germanium in which the end regions have been converted to P-type germanium as shown in Fig. 1. Non-rectifying contacts are fastened to the three germanium regions, the one attached to the layer of N-type germanium being called the base 20. One of the P-type regions is called the emitter 16 and the other P-type region is called the collector 18. The junctions between the N-type and P-type germanium regions act as rectifiers. Very little current flows when the P-type is negative relative to the N-type, whereas a relatively large electron current flows when the P-type is positive relative to the N-type by as little as a fraction of a volt. If the emitter 16 is biased positively with respect to base 20 by a few tenths of a volt, an appreciable number of electrons flow from the N-type base region into the P-type emitter region. This leaves a deficiency of electrons in the base region 20 so that electrons will now flow from the collector 18 to base 20 where they diffuse toward the emitter 16 and initiate current flow through the transistor.

Referring to Fig. 1*a*, it can be seen that the voltage from supply source 10 is sinusoidal. During the half cycle when the polarity of voltage from source 10 is as shown in Fig. 1, emitter 16 will be positive with respect to collector 18. During the first part of the cycle the voltage $V_b$ from signal generator 22 will bias base 20 positively. Remembering that the base must be at all times positive with respect to emitter 16 to cut off current flow through the transistor, it will be obvious that the cut-off voltage amplitude from signal generator 22 must always be greater than the maximum voltage level of supply source 10. Since the transistor is cut off during the first portion of the cycle, the voltage $V_e$ across the transistor is substantially equal to the supply voltage, whereas the current $I_e$ through the transistor is zero. At time $t_1$ the voltage from signal generator 22 falls in the negative direction so that base 20 is now biased negative with respect to emitter 16. Consequently, the transistor conducts and the voltage $V_e$ falls to substantially zero while the current $I_e$ through the transistor abruptly increases from zero and follows a sinusoidal waveform.

On the negative half cycle of the applied voltage source the emitter 16 will be biased negative with respect to collector 18, and base 20 will no longer be negative with respect to emitter 16 so that the transistor cuts off and the voltage $V_e$ increases in the negative direction while current $I_e$ is substantially zero. At time $t_2$ the square wave signal from generator 22 will shift in the positive direction. Now the base 20 has a large positive bias; whereas the emitter 16 will have a large negative bias. This can be a disadvantage of the circuit in that $V_e$ and $V_b$ combine to give very large voltage drops between the emitter and base during this portion of the cycle and may destroy the emitter-to-base junction. The dotted outline in Fig. 1*a* shows an alternate waveform for $V_b$ which will decrease this increased voltage stress.

By shifting the phase of the square wave signal output of generator 22, the period of conduction of transistor 14 may be controlled; and, consequently, the current through the transistor may be controlled also. The signal voltage $V_b$ should never be shifted far enough forward so that it will stop current flow once it has started. If an attempt is made to stop the current, the inductance of the circuit would force current flow through the transistor at a forward drop equal to the voltage $V_e$. This condition would cause dissipation of considerable heat in the transistor and would probably destroy the crystal.

In Fig. 2 the embodiment of the invention shown eliminates the difficulties presented in the circuit of Fig. 1 due to phase shift. A source of alternating current voltage 24 is connected in series with a load impedance 26 and a P–N–P transistor 28 having an emitter 30, base 32 and collector 34. Between emitter 30 and base 32 are connected in series with a current limiting resistor 36 and a battery 38 which serve to bias base 32 positive with respect to emitter 30 and decrease leakage currents across the emitter-to-base junction. Likewise, voltage from battery 40 is applied through rectifier 42 to base 32 to bias it positive with respect to collector 34 and decrease leakage currents between the base-to-collector junction. Conduction through transistor 28 is controlled by a secondary P–N–P transistor 44 which has its base 46 connected to the base 32 of transistor 28 and its collector 48 connected to collector 34 of transistor 28. A source of square wave signal voltage 50 is applied between the emitter 52 and base 46 of transistor 44.

When current flow between the collector and base of transistor 44 is blocked, batteries 38 and 40 minimize leakage currents through the transistor. However, when transistor 44 is unblocked, and the polarity of the voltage from source 24 is as shown, current can flow in the conventional sense from emitter 30 to base 32 and through base 46 and collector 48 of transistor 44, thereby bypassing the emitter 34. With emitter-to-base current in transistor 28, it will conduct from emitter to collector until the secondary transistor 44 again cuts off.

In Fig. 2*a*, it can be seen that the signal voltage $V_s$ from source 50 is originally negative so that transistor 44 is cut off. Consequently, the base current of transistor 28 will also be cut off during this time so that the voltage $V_e$ across transistor 28 will rise with the supply voltage while the current $I_e$ through the transistor is substantially zero. At time $t_1$, the signal voltage $V_s$ will shift in the positive direction so that transistor 44 will now conduct and the base current $I_b$ will flow through the transistor 44. This base current initiates conduction in transistor 28 so that the voltage $V_e$ falls while the current $I_e$ rises in the positive direction and follows a sinusoidal waveform. When the polarity of the voltage from source 24 begins its negative half cycle, transistor 28 will cut off since emitter 30 is now biased negative with respect to base 32, notwithstanding the fact that transistor 44 is still biased by $V_s$ to conduct. Transistor 28 can be made to conduct only on the next positive half cycle when transistor 44 conducts. By shifting the phase of the signal voltage from source 50, the time during which transistor 28 conducts on every positive half cycle may be controlled. In this case, due to the addition of switching transistor 44, the signal voltage $V_s$ may have a much smaller voltage amplitude than the supply voltage since it is not applied directly to transistor 28. Also, no problems arise due to phase shift since the control voltage cannot apply large voltages between the emitter-to-base junction as was the case with the circuit shown in Fig. 1.

In Fig. 3 still another embodiment of the invention is shown in which a bidirectional current flows through the transistor. A source of alternating current voltage 54 is connected in series with a load impedance 56, such as an A.C. welder, and a P–N–P junction transistor 58 having an emitter 60, base 62 and collector 64. In this case the collector 61 and emitter 63 of a first P–N–P switching transistor 66 are connected to emitter 60 and base 62 of transistor 58; and the collector 65 and emitter 67 of a second P–N–P switching transistor 68 are connected to the collector 64 and base 62, respectively. A battery 70 of approximately 0.1 volt has its positive terminal connected to base 62 and its negative terminal connected to the junction of transistors 66 and 68 to decrease leakage currents through the main transistor 58. A source of square wave signal voltage 72 of variable phase angle has one terminal connected to the base 69 of transistor 66 and its other terminal connected to the base 71 of transistor 68. These terminals are shunted by a pair of resistors 74 and 76 which have their junction connected to the negative terminal of battery 70, substantially as shown.

During the first portion of the positive half cycle of voltage source 54 when the emitter of transistor 58 is positive with respect to its collector, the signal voltage $V_b$ will have the polarity indicated in the drawing. The negative voltage applied to the base of transistor 66 will unblock this transistor to apply the positive voltage on emitter 60 to base 62. Thus, transistor 58 is blocked during this portion of the cycle. At time $t_1$, the signal voltage from source 72 reverses polarity so that now transistor 68 is unblocked while transistor 66 is cut off. The negative voltage on collector 64 is now applied to base 62 so that the base is negative with respect to emitter 60, and transistor 58 conducts. Thus, at time $t_1$ the voltage $V_e$ falls to zero while the current $I_e$ increases abruptly from zero and follows a sinusoidal waveform.

When the polarity of the voltage from source 54 reverses at time $t_2$, collector 64 and base 62 will become positive so that the transistor 58 cuts off, $V_e$ rises in the negative direction and $I_e$ falls to zero. At time $t_3$ the polarity of the signal from source 72 again shifts negative so that transistor 66 is unblocked while transistor 68 is cut off. The negative voltage on emitter 60 is now applied to base 62 so that the base is negative with respect to collector 64; and the transistor 58 conducts in the opposite direction, increasing $I_e$ from zero and lowering $V_e$ to zero.

It can thus be seen that a bidirectional current flows through transistor 58. By controlling the phase angle of the square wave voltage from source 72, the period of conduction of transistor 58 on each half cycle of the supply voltage can be controlled, and thus the current through the transistor can be controlled also.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A transistor switching circuit comprising, in combination, a first transistor having an emitter, a collector and a base, a source of alternating current voltage and a load impedance connected in series between said emitter and collector, second and third transistors each having an emitter, a collector and a base, a connection between the collector of the second transistor and the emitter of the first transistor, a connection between the collector of the third transistor and the collector of the first transistor, means connecting the emitters of said second and third transistors respectively to the base of said first transistor, a resistor connecting the bases of the second and third transistors, a source of voltage pulses connected in shunt with said resistor, and a connection between the midpoint of said resistor and the emitters of said second and third transistors respectively.

2. A transistor switching circuit comprising, in combination, a first transistor having an emitter, a collector and a base, a source of alternating current voltage and a load impedance connected between the emitter and collector of said first transistor, second and third transistor switching devices connected in series between the emitter and collector of said first transistor, means connecting the base of said first transistor to the junction of said second and third transistors, and means for rendering said second and third transistors conductive during a portion of each 360 degree cycle of said source of alternating current voltage.

3. A transistor switching circuit comprising, in combination, a first transistor having an emitter, a collector and a base, a source of alternating current voltage and a load impedance connected in series between said emitter and collector, second and third transistors connected in series between said emitter and collector, a source of direct current voltage having its positive terminal connected to the base of said first transistor and its negative terminal connected to the junction of said second and third transistors, and means for rendering said second and third transistors alternately conductive.

4. A transistor switching circuit comprising, in combination, a transistor including a body of semiconductor material having at least two end zones of one conductivity type material separated by an intermediate zone of opposite conductivity type, a source of alternating current voltage and a load impedance connected in series between said end zones, a pair of normally open switching devices connected in series between said end zones, means connecting said intermediate zone with the junction of said switching devices, and means for alternately closing said switching devices.

References Cited in the file of this patent

UNITED STATES PATENTS

| | | |
|---|---|---|
| 2,594,449 | Kircher | Apr. 29, 1952 |
| 2,722,649 | Immel et al. | Nov. 1, 1955 |
| 2,728,857 | Sziklai | Dec. 27, 1955 |
| 2,774,888 | Trousdale | Dec. 18, 1956 |
| 2,776,382 | Jensen | Jan. 1, 1957 |
| 2,780,782 | Bright | Feb. 5, 1957 |
| 2,809,303 | Collins | Oct. 8, 1957 |
| 2,829,281 | Overbeek | Apr. 1, 1958 |
| 2,838,675 | Wanlass | June 10, 1958 |

FOREIGN PATENTS

| | | |
|---|---|---|
| 200,400 | Australia | Dec. 7, 1955 |